United States Patent [19]

Hafeli et al.

[11] Patent Number: 5,090,854
[45] Date of Patent: Feb. 25, 1992

[54] SELF LOCKING NUT

[75] Inventors: Paul B. Hafeli, El Toro; Gregg S. Baker, Lake Forest, both of Calif.

[73] Assignee: Artifex Ltd., Newport Beach, Calif.

[21] Appl. No.: 665,282

[22] Filed: Mar. 6, 1991

[51] Int. Cl.5 .................... F16B 37/00; F16B 39/284
[52] U.S. Cl. .................... 411/186; 411/155; 411/187; 411/427
[58] Field of Search .................... 411/9–11, 411/155, 156, 186, 187, 189, 185, 917

[56] References Cited

U.S. PATENT DOCUMENTS

| | | | |
|---|---|---|---|
| 613,777 | 11/1898 | Putnam . | |
| 815,541 | 3/1906 | Leatherman . | |
| 1,229,911 | 6/1917 | Dodds | 411/186 |
| 1,299,702 | 4/1919 | Glass . | |
| 1,635,082 | 7/1927 | Hultgren . | |
| 1,923,647 | 8/1933 | Vera . | |
| 2,149,359 | 3/1939 | Olson | 411/170 |
| 2,253,241 | 8/1941 | MacDonald . | |
| 2,286,895 | 6/1942 | Carlson . | |
| 2,546,332 | 3/1951 | Costello | 411/9 |
| 3,056,443 | 10/1962 | Knocke | 411/186 |
| 3,150,556 | 9/1964 | Churchill | 411/527 |
| 4,169,630 | 10/1979 | Wagner | 411/427 |
| 4,269,248 | 5/1981 | MacLean et al. . | |
| 4,274,323 | 6/1981 | Resnicow . | |
| 4,498,825 | 2/1985 | Pamer et al. . | |

Primary Examiner—Neill R. Wilson
Attorney, Agent, or Firm—Blakely, Sokoloff, Taylor & Zafman

[57] ABSTRACT

A symmetric self locking nut with a deflecting annular flange that allows the nut to be installed from opposite ends. The nut has a shank with a threaded hole through the longitudinal axis of the shank. Extending from the shank perpendicular to the longitudinal axis, is at least one annular flange. At the end of the flange are a pair of annular rims that extend in opposite directions from the flange. The rims define the outmost end portions of the nut and have outer surfaces that engage the working surface of a workpiece. When the nut is screwed onto the bolt and one of the rims engages the workpiece, the flange deflects causing the nut thread nearest the workpiece to press against the adjacent thread of the bolt. The deflection of the flange increases the frictional force between the threads of the nut and bolt, insuring that the nut is in constant contact with the bolt even when the fasteners are subjected to vibrational loading.

10 Claims, 1 Drawing Sheet

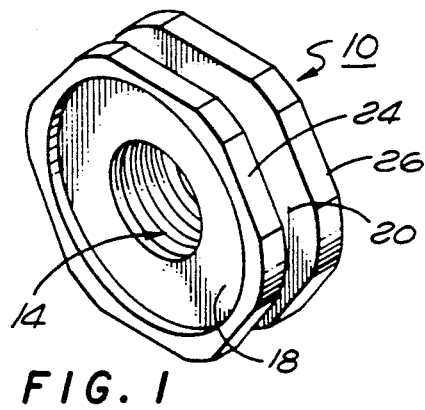
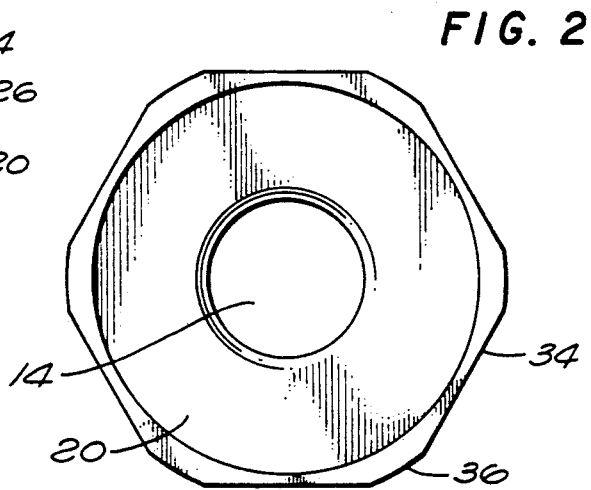
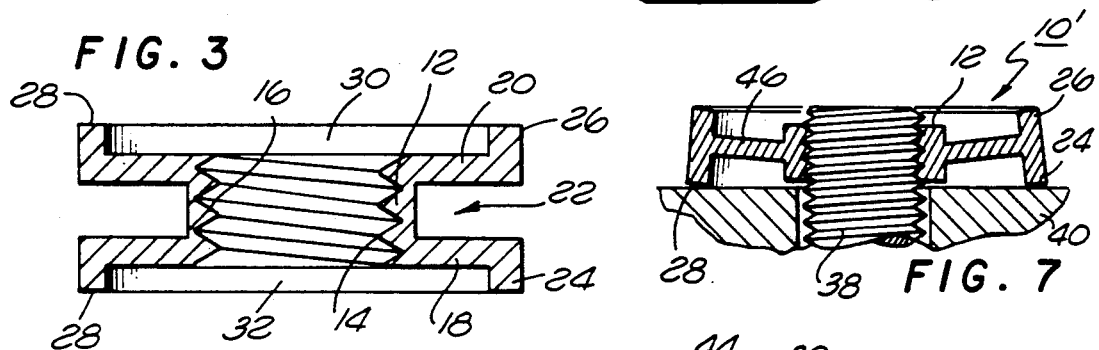
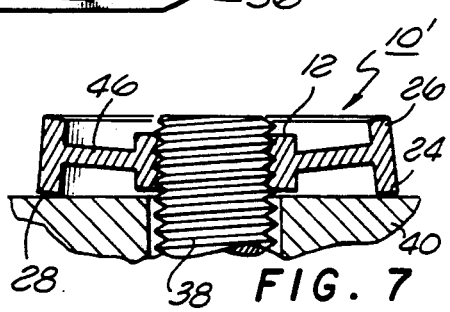
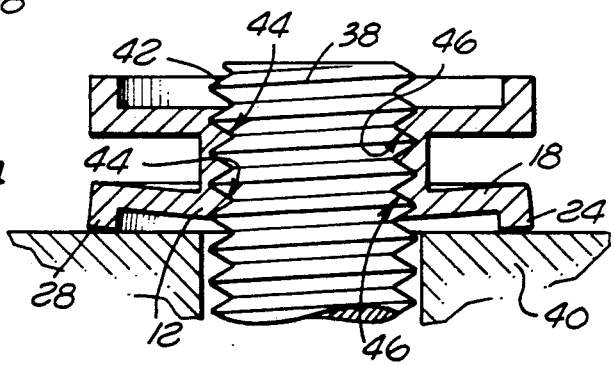
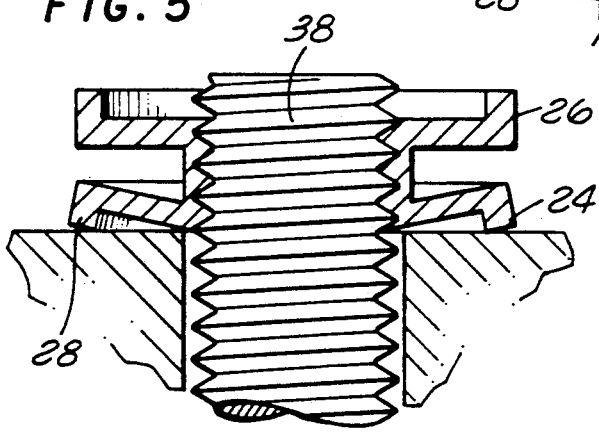
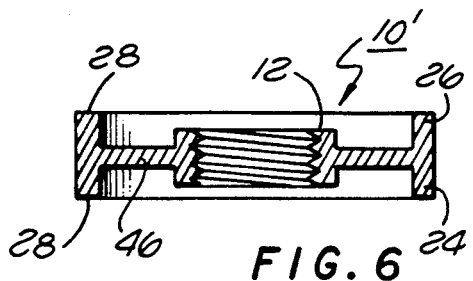

SELF LOCKING NUT

BACKGROUND OF THE INVENTION

1. FIELD OF THE INVENTION

The present invention relates to self-locking nut fasteners.

2. DESCRIPTION OF RELATED ART

When using nut and bolt fasteners it is generally desirable to have means to prevent the nut from loosening due to vibration, thermal expansion, etc. Typically this is done by placing a lock washer between the nut and the working surface to maintain bolt tension in the joint. Having to use a separate washer is cumbersome particularly when the nut is being used in places with limited accessibility. There are also assemblies where there is not enough space between the nut and workpiece for a lock washer. Prior attempts to incorporate a locking feature into the nut itself include U.S. Pat. No. 4,269,248 issued to MacLean et al, which discloses a fastener that has a wavy flange at one end that deforms when the nut is tightened, keeping the bolt in tension. U.S. Pat. No. 2,286,895 issued to Carlson discloses a lock nut that has a locking portion that bends when the fastener engages a working surface. The locking portion clamps against an adjacent thread of the bolt increasing the frictional forces between the nut and the bolt. Although these fasteners provide a locking feature, there has not been to this point a nut that is self-locking at both ends of the nut.

SUMMARY OF THE INVENTION

The present invention is a symmetric self locking nut with a deflecting annular flange that allows the nut to be installed from opposite ends. The nut has a shank with a threaded hole through the longitudinal axis of the shank. Extending from the shank perpendicular to the longitudinal axis, is an annular flange. At the end of the flange are a pair of annular rims that extend in opposite directions from the flange. The rims define the outmost end portions of the nut and have outer surfaces that engage the working surface of a workpiece. When the nut is screwed onto the bolt and one of the rims engages the workpiece, the flange deflects causing the nut thread nearest the workpiece to press against the adjacent thread of the bolt. The deflection of the flange increases the frictional force between the threads of the nut and bolt, insuring that the nut is in constant contact with the bolt even when the fasteners are subjected to vibrational loading. The symmetric rim and flange arrangement of the present fastener allows both ends of the nut to "lock" onto a workpiece and bolt. As an alternate embodiment, the nut may have two annular flanges with extending annular rims, wherein the nut can fasten onto two workpieces.

Therefore it is an object of this invention to provide a nut that can lock onto a workpiece from either end of the nut.

It is also an object of this invention to provide a nut that can lock onto two workpieces on each end of the fastener.

It is also an object of this invention to provide a nut that can lock onto a workpiece from either end of the fastener, that is inexpensive, simple to use and easy to manufacture.

BRIEF DESCRIPTION OF THE DRAWINGS

The objects and advantages of the present invention will become more readily apparent to those skilled in the art after reviewing the following detailed description and accompanying drawings, wherein:

FIG. 1 is a perspective view of a nut of the present invention;

FIG. 2 is a top view of the nut of FIG. 1;

FIG. 3 is a cross-sectional side view of the nut of FIG. 1 showing a shank with a threaded hole through the longitudinal axis and a pair of annular flanges that extend perpendicular from the shank, each flange further having an annular rim that extends perpendicular to the flanges;

FIG. 4 is a cross-sectional side view of the nut of FIG. 3 screwed onto a bolt, wherein the bottom annular rim has engaged a workpiece and the lower flange is deflected;

FIG. 5 is a cross-sectional side view similar to FIG. 4, showing the nut completely turned onto the bolt, such that the flange has deflected to such an extent that the shank is in contact with the workpiece;

FIG. 6 is a cross-sectional side view of an alternate embodiment of a nut of the present invention, showing the annular rims extending from a single annular flange that extends from the shank;

FIG. 7 is a cross-sectional side view of the nut of FIG. 6 screwed onto a bolt, wherein the bottom annular rim has engaged a workpiece and the flange is deflected.

DETAILED DESCRIPTION OF THE INVENTION

Referring to the drawings more particularly by reference numbers, FIGS. 1-3 shows a nut 10 of the present invention. The nut 10 has a shank 12 with a threaded hole 14 along the longitudinal axis of the shank 12. The threaded hole 14 should have at least three threads 16 that can be either course or fine thread (UNC or UNF). Extending essentially perpendicular from the shank 12 and threaded hole 14 are first 18 and second 20 annular flanges, that are spaced apart a predetermined distance by an annular groove 22. Extending from the first 18 and second 20 flanges are first 24 and second 26 annular rims, respectively. Each rim has an outer surface 28 that defines the outmost portion of the ends of the nut 10. The rims can be formed by constructing first 30 and second 32 counterbores in the flanges as shown in FIG. 3. The nut 10 itself, if of high strength metal, preferably is machined from bar stock or possibly a headed blank. The outer surface 34 of the flanges can be hexagonal in shape to allow the nut 10 to be easily turned by human fingers. The corners 36 can be broken to eliminate any sharp edges, this being particularly useful when the nut is used as a surgical implant, where a sharp point could tear soft tissue, or in other applications such as in electrical apparatus wherein abrasion of harnesses and/or arcing may be considerations.

FIGS. 4 and 5 show the nut 10 fastened to a bolt 38 extending from a workpiece 40. The bolt 38 has threads 42 that match the threads 16 of the shank 12 to allow the nut 10 to be screwed onto the bolt 38. As shown in FIG. 4, when the nut 10 is screwed onto the bolt 38, the outer surface 28 of the first rim 24 engages the workpiece 40. The first flange 18 is deflected by the continuous turning of the nut 10 or bolt 38 and the movement of the shank 12 toward the workpiece 40. The deflection of the flange 18 causes the top surfaces 44 of the shank threads 12 to press against the bottom surfaces 46 of the adjacent threads of the bolt 38, with the flange 18 deflection and elasticity providing a high frictional force between the rim of the nut and the work piece, preventing the nut from loosening due to vibrational loading, thermal expansion or the like. The torque applied to the nut can vary depending on the application of the nut 10 and bolt 38 fastener assembly.

The nut 10 may be of such construction that the flanges can deflect until the shank 12 comes in contact with the workpiece 40 as shown in FIG. 5, or alternatively may be of such construction that the desired holding force (typically controlled by installation torque) is achieved without the shank coming in contact with the workpiece as shown in FIG. 4. In many applications it is preferable to construct the nut from a steel or nonferrous material with a high yield strength so that the flanges do not plastically deform when the nut is installed, allowing the nut to be reused. In some applications it is preferable to use a stainless steel with a yield strength greater than 100,000 pounds per square inch (PSI), though other high strength ferrous and/or nonferrous metals may also be used. In other applications such as electrical, high humidity and other applications, the nut may be fabricated from a plastic by injection molding techniques using a fiber filled resin, if desired, for increased strength and elasticity. If the flange thickness, length and the distance from the rims to the shank are such that the shank 12 comes in contact with the workpiece 40 before the flange deflects beyond the material yield point, the shank 12 will act as a stop to prevent the nut from being plastically deformed. Because the present nut has two symmetric deflectable flanges and rims, either end of the nut 10 can engage and lock onto the workpiece 40. There is no longer a need to insure the proper orientation of the nut 10 as required in prior self-locking fasteners. This is particularly advantageous when the nut or nuts must be installed in a very short period of time. This nut is also useful in automated assemblies where the step of insuring nut orientation is now avoided. Additionally, a second workpiece can be attached to the bolt 38 that engages the second rim 26 and deflects the second flange 20, providing an added advantage over nuts of the prior art.

FIG. 6 shows an alternate embodiment, wherein a single annular flange 46 extends from the shank 12 and the first 24 and second 26 annular rims extend in opposite directions from the flange 46. The outer surface 28 of the rims again define the outermost portions of the ends of the nut 10'. The nut 10' functions in the same manner as the nut 10 described above, wherein the flange 46 deflects when the nut 10' is screwed onto a bolt 38 and one of the annular rims engages a workpiece 40, the nut 10' again being symmetric so that the fastener can be utilized from either end. FIG. 7 shows the nut 10' installed on a bolt 38 such that the flange 46 is deflected. The nut 10' can be turned onto the bolt 38 until the shank 12 comes into contact with the workpiece 40, similar to what is shown in FIG. 5. This embodiment has the advantage of being fabricatable by heading, if of the appropriate metal, or by injection molding if of plastic using a lower cost mold than for the first embodiment, yielding a lower cost nut for general application.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described since various other modifications may occur to those ordinarily skilled in the art.

What is claimed is:

1. A locking nut that fastens to a threaded member and a workpiece, comprising:
   a shank having a longitudinal axis and a threaded hole extending through said shank along said longitudinal axis;
   an annular flange extending from said shank essentially perpendicular to said threaded hole; and,
   a pair of annular rims each extending from said annular flange in opposite directions, each said annular rim having an outer surface that defines the outmost end portions of the locking nut;
   whereby said shank can be screwed onto the threaded member such that either one of said annular rims can engage the workpiece, deflecting said annular flange to further secure said shank to the threaded member.

2. The locking nut as recited in claim 1, wherein said flange has a hexagonal shape.

3. The locking nut as recited in claim 1, wherein said annular rims are each perpendicular to said annular flange.

4. A locking nut that fastens to a threaded member and a workpiece, comprising:
   a shank having a longitudinal axis and a threaded hole extending through said shank along said longitudinal axis; and
   a pair of annular flanges spaced apart a predetermined distance and extending from said shank essentially perpendicular to said threaded hole, each said annular flange having an annular rim extending therefrom such that said annular rims are extending in opposite directions, each said annular rim having an outer surface that defines the outmost end portions of the locking nut;
   whereby said shank can be screwed onto the threaded member such that one of said annular rims engages the workpiece, deflecting only said adjoining annular flange to further secure said shank to the threaded member.

5. The locking nut as recited in claim 4, wherein said flanges have a hexagonal shape.

6. The locking nut as recited in claim 4, wherein said annular rims are each perpendicular to said adjoining annular flange.

7. A fastener assembly, comprising:
   a workpiece;
   a threaded member extending essentially perpendicular to said workpiece;
   a nut fastened to said threaded member, said nut including;
       a shank having a longitudinal axis and a threaded hole extending through said shank along said longitudinal axis;
       an annular flange extending from said shank, said annular flange being deflected such that said shank is adjacent said workpiece; and,
       a pair of annular rims each extending from said annular flange in opposite directions and being adapted such that either one of said annular rims can engage the workpiece to deflect said annular flange, each said annular rim having an outer surface that defines the outmost end portions of the locking nut, said outer surface of one of said annular rims being in contact with said workpiece;

whereby said deflection of said annular flange further secures said shank to said threaded member.

8. The fastener assembly as recited in claim 7, wherein said shank is in contact with said workpiece.

9. A fastener assembly, comprising:
a workpiece;
a threaded member extending essentially perpendicular to said workpiece;
a nut fastened to said threaded member, said nut including;
a shank having a longitudinal axis and a threaded hole extending through said shank along said longitudinal axis; and,
a pair of annular flanges extending from said shank, one of said annular flanges being deflected such that said shank is adjacent said workpiece, each annular flange having an annular rim extending therefrom such that said annular rims are extending in opposite directions, each said annular rim having an outer surface that defines the outmost end portions of the locking nut, said outer surface of said annular rim adjoining said deflected annular flange being in contact with said workpiece;

whereby said deflection of said annular flange further secure said shank to said threaded member.

10. The fastener assembly as recited in claim 9, wherein said shank is in contact with said workpiece.

* * * * *